No. 711,517.  
J. MOORE.  
TYPE WRITING MACHINE.  
(Application filed Nov. 22, 1901.)  
Patented Oct. 21, 1902.

(No Model.)

Witnesses  
W. H. Alexander  
J. R. Watkins

Inventor  
Jemerson Moore  
By Attorneys

No. 711,517. Patented Oct. 21, 1902.
J. MOORE.
TYPE WRITING MACHINE.
(Application filed Nov. 22, 1901.)

(No Model.) 12 Sheets—Sheet 5.

Witnesses
W. A. Alexander
J. R. Watkins

Inventor
Jemerson Moore
By Attorneys
Fowler & Bryson

THE NORRIS PETERS CO., PHOTO-LITHO., WASHINGTON, D. C.

No. 711,517. Patented Oct. 21, 1902.
J. MOORE.
TYPE WRITING MACHINE.
(Application filed Nov. 22, 1901.)
(No Model.) 12 Sheets—Sheet 6.

Inventor
Jemerson Moore

No. 711,517. Patented Oct. 21, 1902.
J. MOORE.
TYPE WRITING MACHINE.
(Application filed Nov. 22, 1901.)
(No Model.) 12 Sheets—Sheet 8.

Witnesses
W. A. Alexander
J. R. Watkins

Inventor
Jemerson Moore
By Attorneys

No. 711,517. Patented Oct. 21, 1902.
J. MOORE.
TYPE WRITING MACHINE.
(Application filed Nov. 22, 1901.)
(No Model.) 12 Sheets—Sheet 9.

Witnesses
W. J. Alexander
J. R. Watkins

Inventor
Jemerson Moore
By Attorneys

No. 711,517. Patented Oct. 21, 1902.
J. MOORE.
TYPE WRITING MACHINE.
(Application filed Nov. 22, 1901.)
(No Model.) 12 Sheets—Sheet 11.

Witnesses
W. H. Alexander
J. R. Hatkins

Inventor
Jemerson Moore
By Attorneys

No. 711,517.　　　　　　　　　　　　　　　Patented Oct. 21, 1902.
J. MOORE.
TYPE WRITING MACHINE.
(Application filed Nov. 22, 1901.)

(No Model.)　　　　　　　　　　　　　　　　　　　12 Sheets—Sheet 12.

Witnesses
W. A. Alexander
J. R. Harkins

Inventor
Jemerson Moore
By Attorneys

United States Patent Office.

JEMERSON MOORE, OF HARRISON, ARKANSAS.

TYPE-WRITING MACHINE.

SPECIFICATION forming part of Letters Patent No. 711,517, dated October 21, 1902.

Application filed November 22, 1901. Serial No. 83,317. (No model.)

*To all whom it may concern:*

Be it known that I, JEMERSON MOORE, a citizen of the United States, residing at Harrison, in the county of Boone and State of Arkansas, have invented a certain new and useful Type-Writing Machine, of which the following is such a full, clear, and exact description as will enable any one skilled in the art to which it appertains to make and use the invention, reference being had to the accompanying drawings, forming part of this specification.

My invention relates to type-writing machines, and more particularly to type-writing machines which are adapted to write on an ordinary blank or account book. Many features of my machine, however, are applicable to the other forms of type-writer.

My invention consists in part in the combination, with a movable type-carriage, of a normally stationary keyboard and operating connections between said keyboard and type-carriage.

My invention also consists in many other novel features and details of construction, all of which are described in the following specification and pointed out in the claims affixed thereto.

In the accompanying drawings, which illustrate one form of type-writing machine made in accordance with my invention.

Like marks of reference refer to similar parts in the several views of the drawings.

Figure 1:
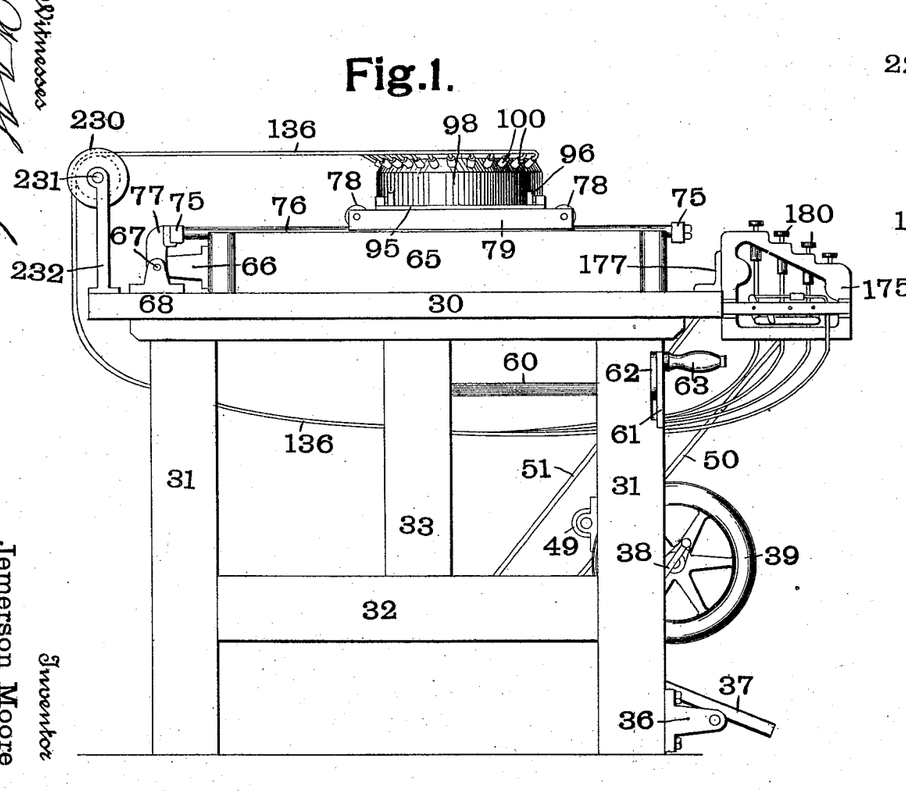
Figure 1 is a side view, on a reduced scale, showing the complete machine.
Figure 3:
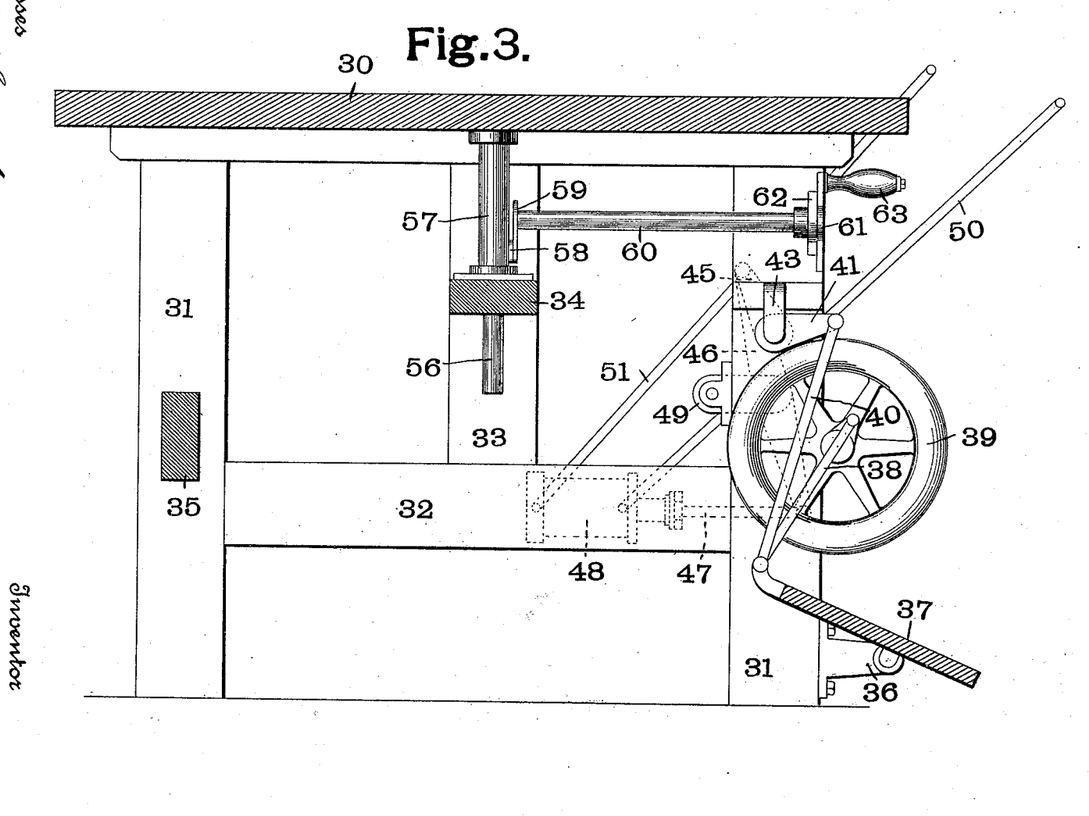
Fig. 3 is a vertical central section of the machine, the keyboard and type-carriage being removed.
Figure 4:
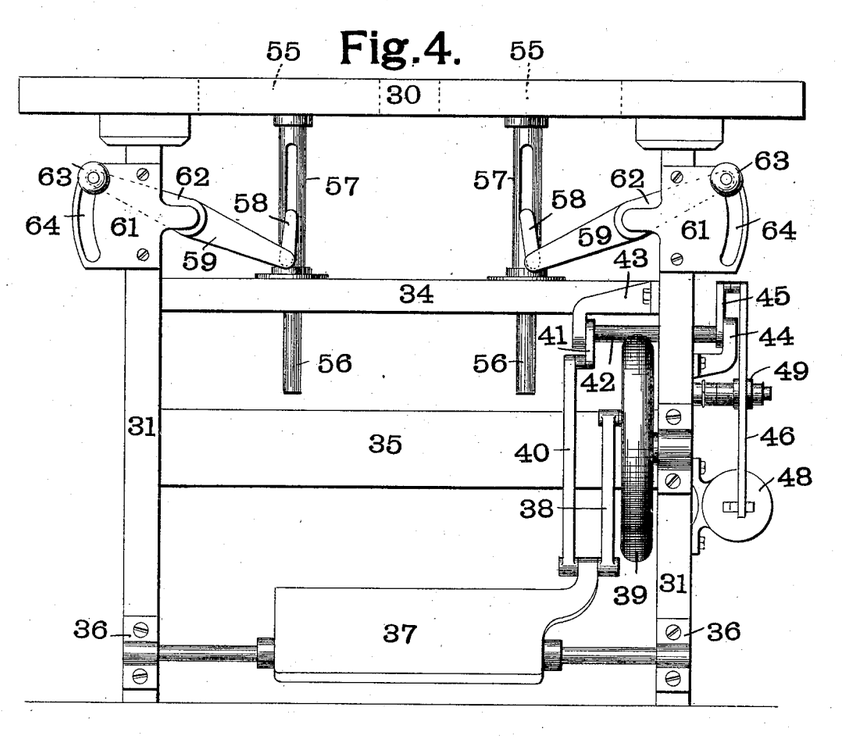
Fig. 4 is a front elevation of the parts shown in Fig. 3.

Referring first to Figs. 1, 3, and 4, the working parts of the machine are carried by a framework consisting of a table-top 30, supported by means of corner-pieces 31. The corner-pieces 31 are connected by means of side bars 32, supporting uprights 33. The uprights 33 carry a central cross-bar 34, and the rear corner-pieces 31 are preferably connected by means of a brace 35. Journaled in brackets 36, carried by the front corner-pieces 31, is a pedal 37. The pedal 37 is connected, by means of a pitman 38, with a fly-wheel 39, which is journaled in one of the corner-pieces 31. The said pedal 37 is also connected by means of a link 40, with an arm 41, rigidly carried on a rock-shaft 42, journaled in brackets 43 and 44, carried by one of the corner-pieces 31. Secured on the opposite end of the shaft 42 is a second arm 45. Pivoted to the arm 45 is one end of a lever 46, the opposite end of which is pivoted to the piston-rod 47 of an air-pump 48. The lever 46 is pivoted to a link 49, which is carried by the corner-pieces 31. Leading from the air-pump 48 are an exhaust-pipe 50 and a pressure-pipe 51. These pipes are connected to the keyboard mechanism, as will be hereinafter described. The table-top 30 is provided with two movable portions 55. (Best shown by dotted lines in Fig. 6.) These movable portions 55 are carried by rods 56, which pass down through hollow sleeves 57, carried on the central crosspiece 34. Each of the rods 56 is connected, by means of a link 58, with an arm 59, carried by a rock-shaft 60. The rock-shaft 60 is journaled in a plate 61, carried on one of the front corner-pieces 31. Carried by the rock-shaft 60 is an arm 62, to which is attached a handle 63, which passes through a slot 64 in the plate 61 and by means of which the arm 59 can be clamped in any desired position, so as to raise or lower the movable parts 55 of the table upon which parts the book rests.

Figures 6, 7:
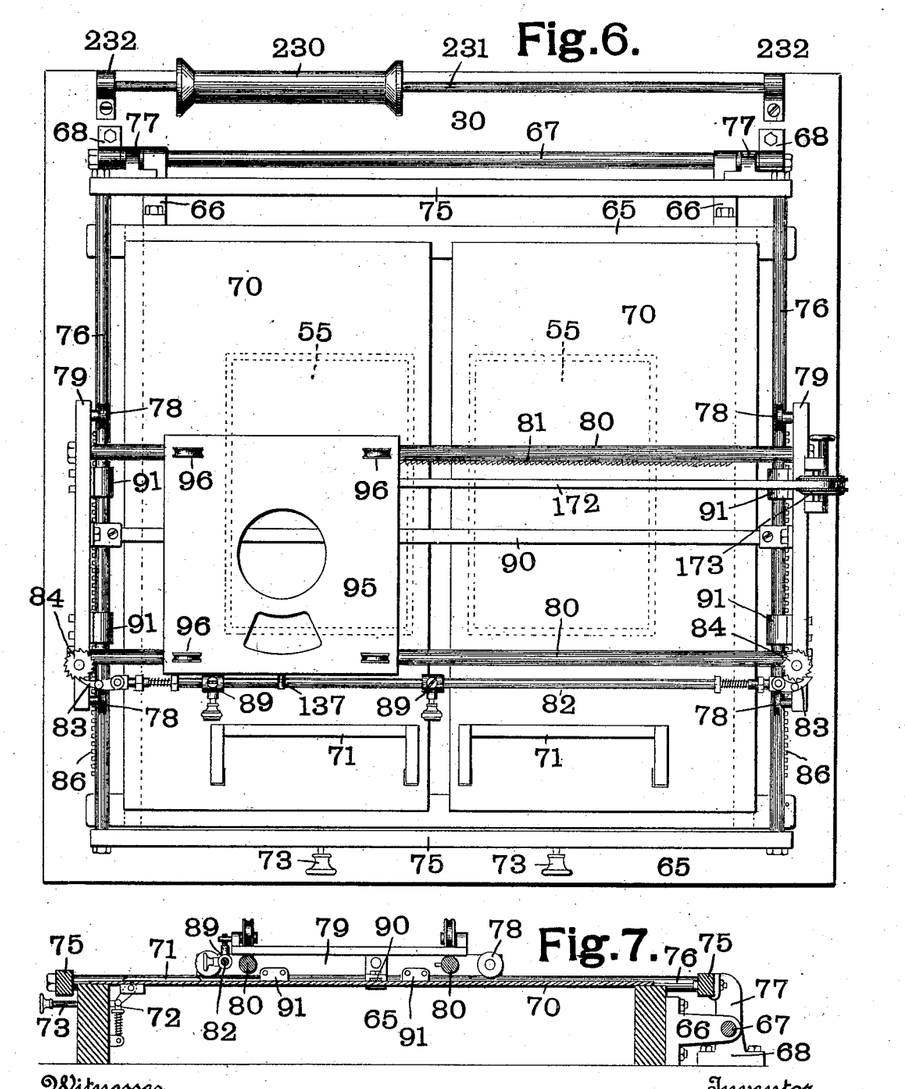
Fig. 6 is a top plan view of the machine, the keyboard being omitted and the type-carriage being shown only in outline.
Fig. 7 is a vertical longitudinal section, on a reduced scale, showing the frames carrying the type-carriage.
Figure 8:
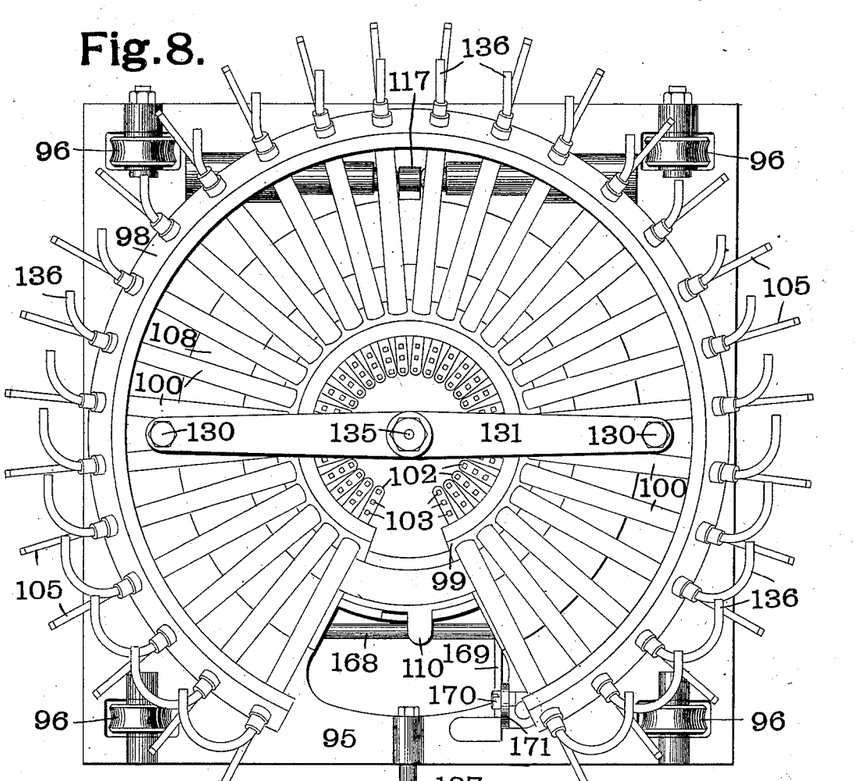
Fig. 8 is a top plan view of the type-carriage.
Figure 13:
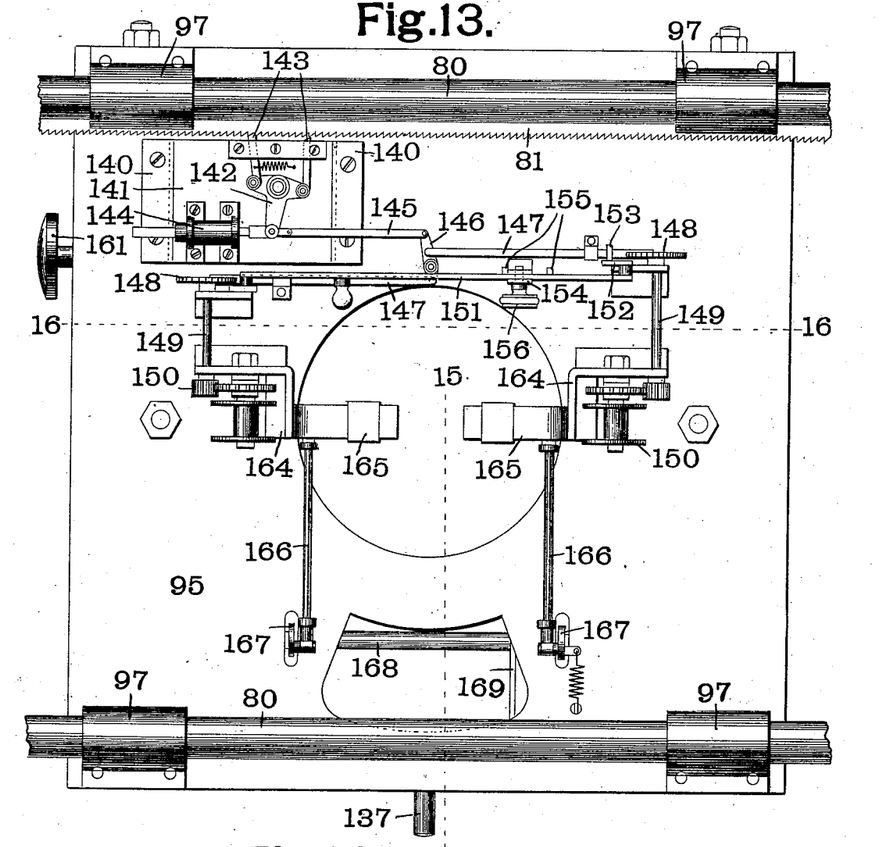
Fig. 13 is a bottom plan view of the type-carriage.
Figure 14:
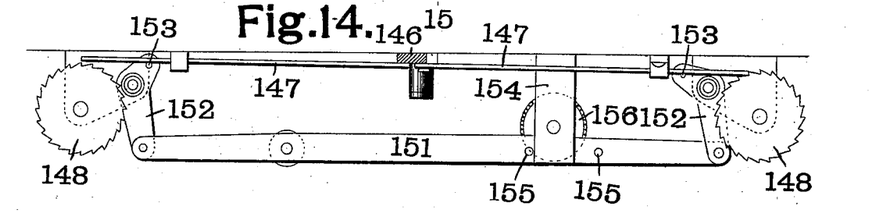
Fig. 14 is an enlarged detail view showing the ribbon-feeding mechanism.
Figures 15, 16, 17:
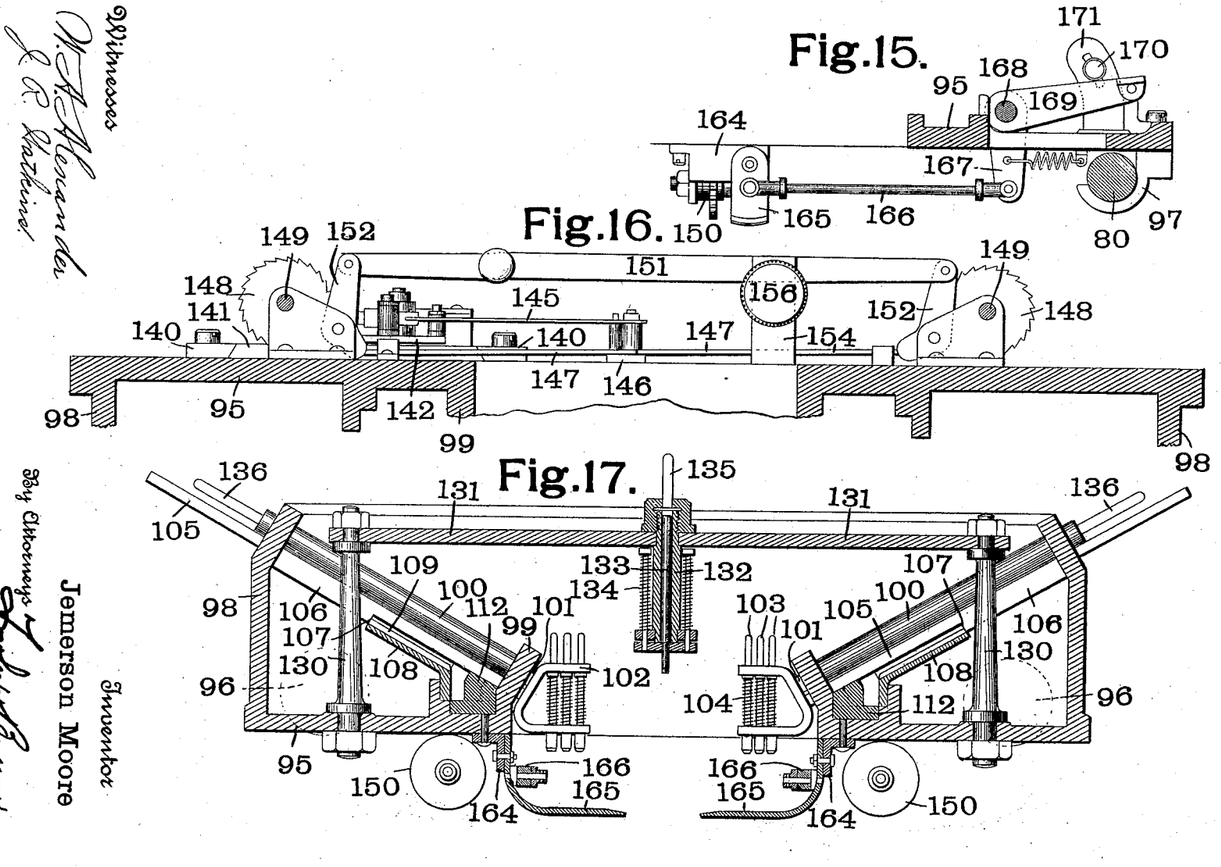
Figs. 15 and 16 are slightly-enlarged sectional views taken on the lines 15 15 and 16 16, respectively, of Fig. 13.
Fig. 17 is a vertical central section through the type-carriage.
Figure 18:
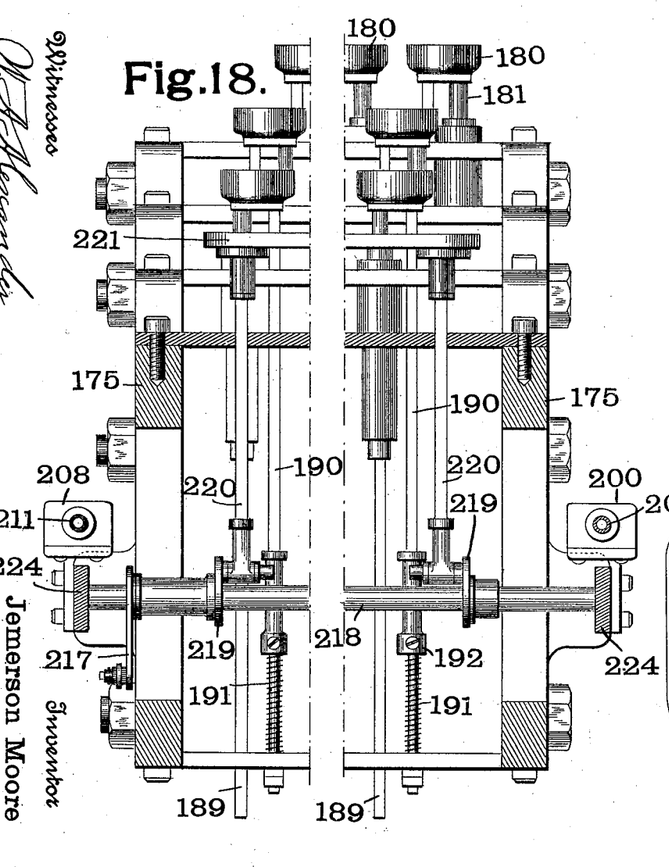
Fig. 18 is a front view, partly in elevation and partly in section, showing the keyboard, the central portion being broken away.

Referring next more particularly to Figs. 1, 6, 7, and 24, 65 is a frame resting on the table-top 30. The frame 65 is pivoted, by means of hinges 66, to a rod 67, supported by brackets 68, secured to the table-top 30. Secured to the top of the frame 65 are two platens 70, upon which the writing is done. These platens 70 are preferably formed of sheet metal covered on their upper surfaces with rubber. The two platens 70 are placed some distance apart, as shown in Fig. 6, so that the leaves of the book may be passed up through the opening between the platens. In order to secure the lower edges of the leaves to the platens 70, I provide clamps 71. (Best shown in Figs. 6 and 7.) These clamps 71 are normally held firmly against the platens 70 by means of a spring-actuated toggle mechanism 72. In order to release the clamps, I provide a rod 73, passing through the front part of the frame 65. By pressing on this rod 73 the clamps 71 will be raised from the surface of the platens 70. Resting on the frame 65 is a second frame, which consists of end pieces 75 and side rods 76, which act as guide-rods for the movement of the type-carriage in the direction of the length of the page, as will be hereinafter described. This second frame is also pivoted to the rod 67 by means of hinges 77. Running on the rods 76 are four wheels 78, carried by end pieces 79. The end pieces 79 are connected by means of guide-rods 80, upon which the type-carriage proper runs. One of the rods 80 is provided with a ratchet-rack 81, which coöperates with the mechanism for feeding the type-carriage across the page, as will be hereinafter described. In order to feed the frame consisting of the bars 79 and rods 80 in the direction of the length of the page to give the line-spacing, I provide a longitudinally-movable bar 82, which carries on its ends pawls 83, engaging with ratchet-wheels 84 at each end of the frame. Connected on the same shaft with each of the ratchet-wheels 84 is a spur-wheel 85, Fig. 24. The spur-wheel 85 at the right hand of the machine gears directly into a rack 86, carried by the rod 76, while that at the left-hand end of the machine is connected to the rack 86 at the left-hand side by means of an intermediate spur-wheel 87. Carried on the rod 82 are two adjustable abutments 89, which are adapted to limit the movement of the type-carriage and also to automatically move the carriage in the direction of the length of the page, as will be hereinafter described. Carried by the end pieces 79 is a strip 90, which is adapted to bear against the surface of the paper resting on the platens 70, and thus hold the same in close contact with the platens while it is being written upon. In order to prevent the frame carrying the type-carriage from being disengaged from the rods 76, I provide the end frame 79 with brackets 91, which partially embrace the said rods 76. 95, Figs. 8 to 15, is the base of the type-carriage. This base 95 is provided with wheels 96, which run on the rods 80, hereinbefore described. In order to prevent the type-carriage from becoming disengaged from the rods 80, I provide the base 95 with brackets 97, which are similar to the brackets 91, hereinbefore described, and which partially embrace the said rods 81, as best shown in Figs. 13 and 15. On the upper face of the base 95 are formed two annular projections 98 and 99. Carried by these annular parts 98 and 99 are a series of radially-disposed cylinders 100, in which work pistons 101, Fig. 17, each carrying on its end a frame 102, in which are arranged three vertical type-bars 103, as shown in Figs. 8 and 17. The pistons 101 are drawn into the cylinders 100 or forced out of the same by means of compressed or rarefied air through the agency of the keyboard, as will be hereinafter described. The type-bars 103 are held in their normal position in the frame 102 by means of springs 104 and are driven against the paper by means which will be hereinafter described. Each of the frames 102 has secured to it a guide-bar 105, which passes up beneath the cylinder 100 and is provided with an offset 106, the lower end of which forms a shoulder 107. Beneath the guide-bars 105 is an annular member 108, which when turned in one position engages with the shoulders 107, but which turned in another position will allow the guide-bars 105 to move downward, the offset 106 passing through slots 109 in the said part 108. The annular member 108 is preferably moved by means of a finger-piece 110 at the front part of the type-carriage, as shown in Fig. 8. Arranged between the part 108 and the inner projection 99 is an annular member 112. (Best shown in Fig. 10.) The annular member 112 is provided with a number of stops corresponding in number to the cylinders 100. Each of the stops consist of three shoulders 113, 114, and 115, respectively. When the member 112 is in its normal position, the stops are in such position that the shoulder 107 of the guide-bar 106 will come in contact with the central shoulder 114 when the piston 101 is forced out of the cylinder, and thus bring the central one of the three type-bars 103 under the hammer, which will be hereinafter described. When the member 112 is moved in one direction, the shoulder 107 will come in contact with the inner shoulder 113, thus bringing the outer type-bar 103 under the hammer, and when moved in the opposite direction the shoulder 107 will strike the outer shoulder 115, thus bringing the inner type-bar under the hammer. In order to move the annular member 112, I secure to it an arm 117. (Best shown in Figs. 10 and 12.) The end of the arm 117 is held between two spring-actuated members 118, and the annular member 112 is then held in its normal position until one of the shift-keys is operated. The members 118 are actuated by springs 119, and their movement is limited by means of pins 120, passing through slots 121 in sleeves 122. The arm 117 is pivotally connected to a bar 125, which connects two pistons 126, working in a cylinder 127. The ends of the cylinder 127 are connected to pipes 128, which lead to the shift-keys, which will be hereinafter described. Carried by means of posts 130, Figs. 8 and 17, secured to the base 95 of the type-carriage, is a cross-bar 131. This cross-bar 131 carries a cylinder 132, in which works a piston 133, the lower end of which acts as the hammer to bring the type-bars 103 against the paper. The piston 133 is normally held in a raised position by means of springs 134, as shown in Fig. 17. Compressed or rarefied air is supplied to the cylinder 132 by means of a flexible tube 135, which leads to the keyboard mechanism, together with the pipes 128, hereinbefore referred to, and pipes 136, which lead to the cylinders 100. Carried at the front edge of the base 95 is a pin 137, Figs. 6, 8, and 13, which is adapted to strike against the adjustable abutments 89 to limit the movement of the type-carriage and also to automatically perform the line-spacing.

Figure 5:
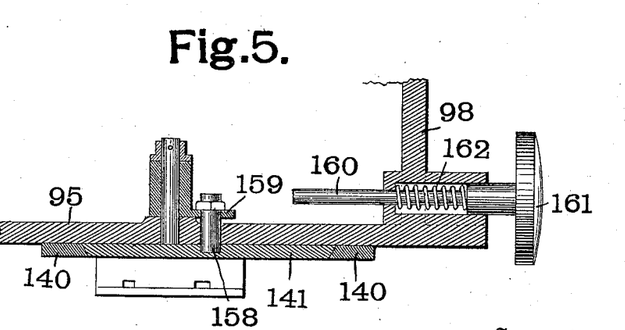
Fig. 5 is an enlarged section on the line 5 5 of Fig. 9.

Secured to the under face of the base 95 by means of guides 140 is a sliding plate 141, Figs. 5, 9, 13, and 16. Pivoted to the plate 141 is a T-shaped lever 142, Fig. 13, carrying on its arms pawls 143, which engage with the rack 81 on the rod 80. The lever 142 is actuated by means of a cylinder 144, which is connected, by means of a flexible tube, with the keyboard mechanism. The cylinder 144 is also connected, by means of a link 145, with a lever 146. The lever 146 has pivoted to it two pawls 147, each of which engages with a ratchet-wheel 148. The ratchet-wheels 148 are connected, by means of shafts 149, with the ribbon-feeding mechanism 150. 151 is a longitudinally-movable bar, to the ends of which are pivoted two bell-crank levers 152, which are provided with pins 153, adapted to bear on the levers 147. The bar 151 passes through a guide 154, and the movement of the said bar is limited by pins 155, which strike against the said guide 154. The bar is clamped in the desired position by means of a thumb-screw 156. When the bar 151 is moved until one of the pins 155 comes in contact with the guide 154, one of the pawls 147 will be raised out of engagement with the corresponding wheel 148 and the other pawl will be dropped into engagement with the other ratchet-wheel 148, so that by moving the bar 151 in one direction or the other the feed of the ribbon can be reversed. (See Fig. 14.) In order to disengage the feeding mechanism from the ratchet-bar 81, the block 141 is slidingly mounted, as above described, and it engages with a pin 158, Figs. 5, 10, and 11, which is carried by a bell-crank lever 159, pivoted to the upper face of the base 95. The long arm of the bell-crank lever 159 is pivoted to a rod 160, which projects through an opening in the annular member 98 and is provided at its end with a button 161. The feed mechanism is normally held in engagement with the ratchet-bar 81 by means of a coil-spring 162, surrounding the rod 160, as shown in Fig. 5. Pivoted to the brackets 164, which carry the ribbon-feeding mechanism 150, are two ribbon-guides 165, Figs. 13 and 15. These ribbon-guides 165 are curved on their under faces, as shown in Fig. 15. The guides 165 are connected, by means of rods 166, with arms 167, projecting down through the base 95. The arms 167 are rigidly carried by a rod 168, to which is attached a lever 169, adapted to be operated by pressure. The lever 169 is held in position by means of a screw 170, passing through the guide 171. The type-carriage is impelled toward the right-hand side of the machine by a flexible band 172, secured at one end to said carriage and at the other to a suitable spring mechanism 173.

Figure 2:
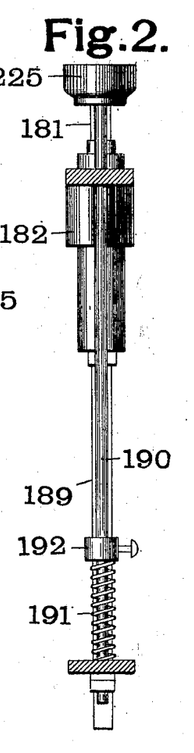
Fig. 2 is a detail view of one of the shift-keys.
Figure 19:
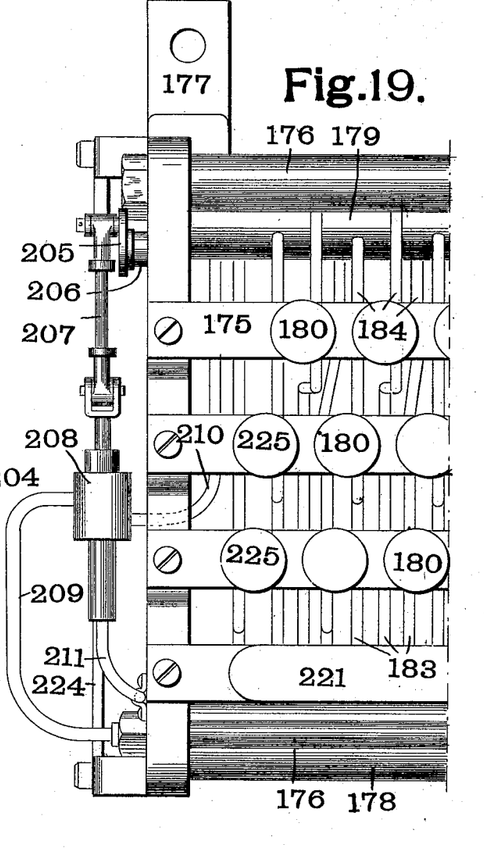
Fig. 19 is a top plan view of one end of the keyboard.
Figures 20, 21:
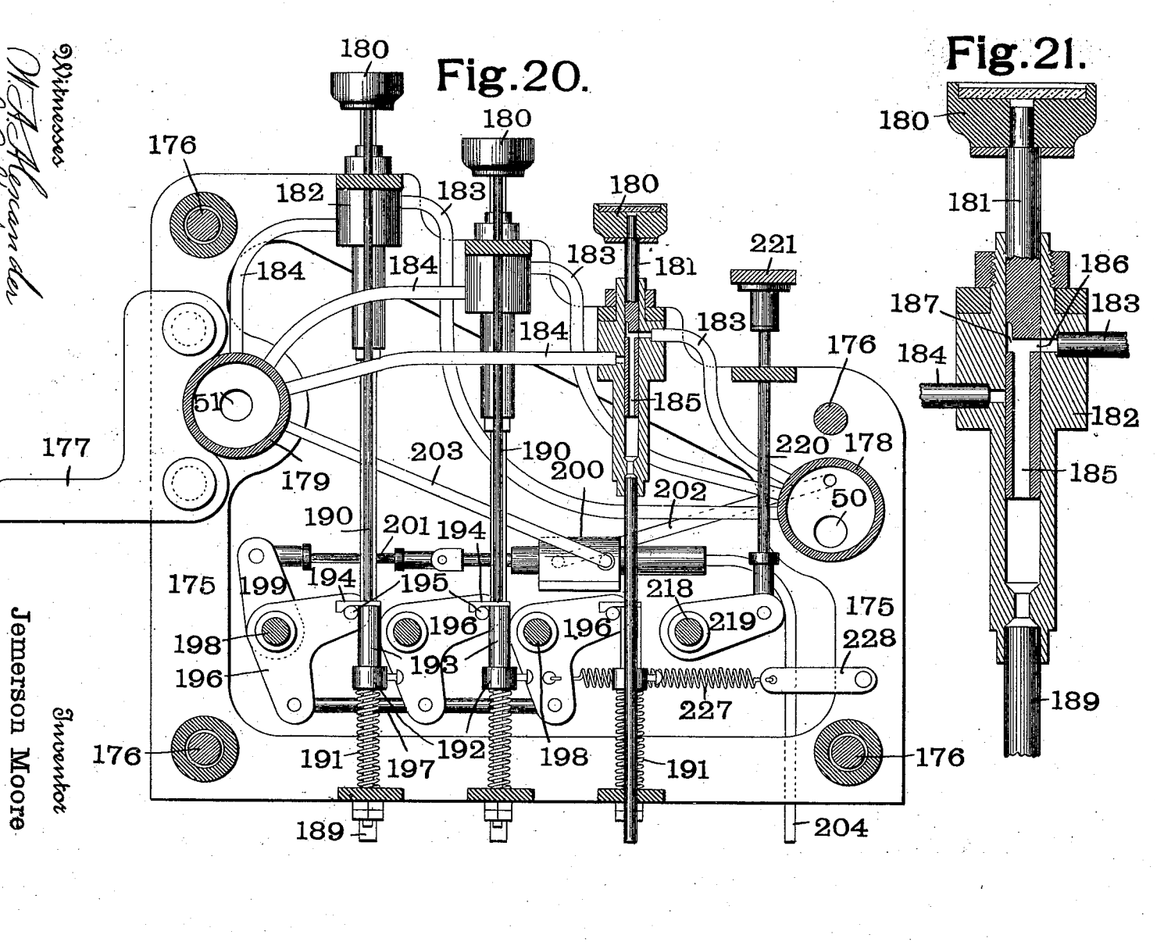
Fig. 20 is a vertical section through the keyboard.
Fig. 21 is an enlarged central section of one of the keys.
Figure 22:
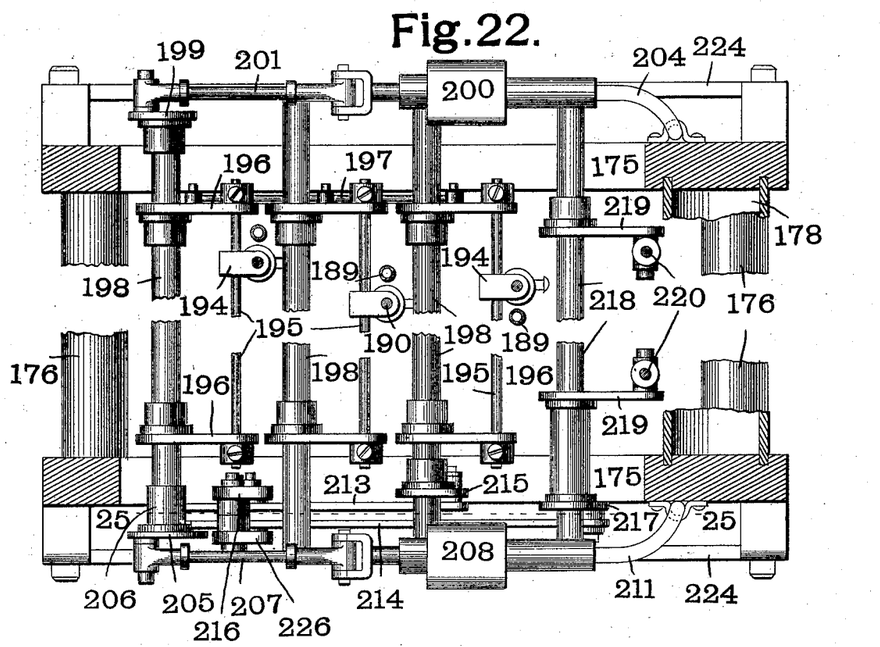
Fig. 22 is a horizontal section through the keyboard, the central portion being broken away.
Figure 23:
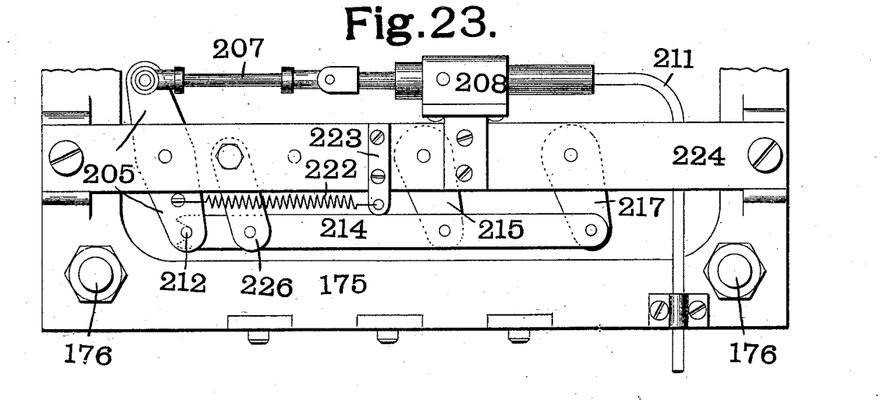
Fig. 23 is a side elevation of the lower portion of the keyboard.
Figure 24:
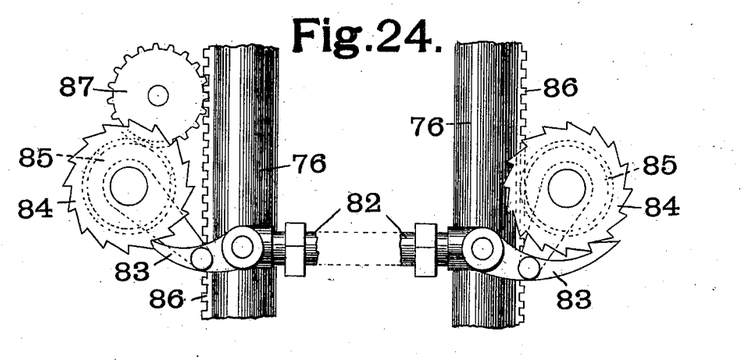
Fig. 24 is an enlarged detail view showing the line-spacing mechanism.
Figure 25:
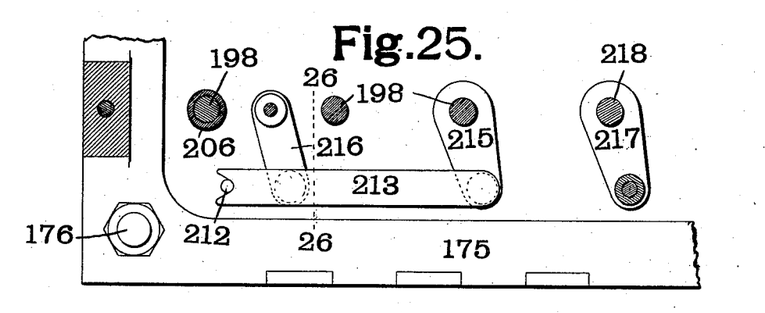
Fig. 25 is a section on the line 25 25 of Fig. 22.
Figure 26:
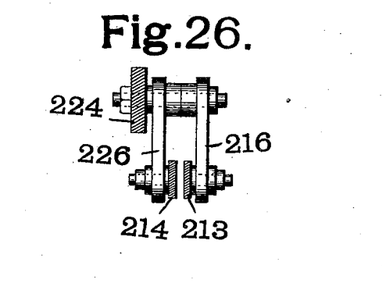
Fig. 26 is a section on the line 26 26 of Fig. 25.

The key mechanism is carried by two frames 175, connected by rods 176, Figs. 18 to 23. The frames 175 are provided with lugs 177, which are adapted to be fastened to the front part of the table-top 30, as shown in Fig. 1. Extending between the frames 175 are tubes 178 and 179, which are connected with the pipes 50 and 51, respectively, so that when the machine is in operation the tube 178 always contains rarefied air and the tube 179 always contains air under pressure. 180 represents the keys, each of which is provided with a main stem 181, passing down through a valve-casing 182. Each of the valve-casings 182, Figs. 20 and 21, is connected, by means of pipes 183 and 184, with the tubes 178 and 179, respectively. In the valve-stem 181 is formed a longitudinal opening 185, which is adapted to normally communicate through an opening 186 with the pipe 183 and when the stem is depressed to communicate through an opening 187 with the pipe 184. The opening 187 is preferably extended upward some distance, as best shown in Fig. 21, so as to lengthen the time during which the pipe 184 is in communication with the central opening 185. The air after passing through the opening 185 enters a pipe 189, which is connected with one of the flexible tubes 136, hereinbefore described, which lead to the cylinders 100 for operating the type-bars. Besides the valve-stem 181 each of the keys is provided with a second stem 190, which serves as a guide to prevent the key from being rotated and also holds the keys in their normal position by means of a spring 191, surrounding the lower end of the said rod 190 and bearing against a collar 192 on the said rod. The collar 192 is provided with an upward extension 193, which carries a finger 194, which rests on a cross-bar 195, Fig. 22. The cross-bar 195 is carried in two bell-crank levers 196. There are three sets of these bell-crank levers 196, as is best shown in Figs. 20 and 22. The three levers at one side of the machine are connected by means of a rod 197, so that all the levers move in unison when one of the keys is depressed. The bell-crank levers 196 are rigidly mounted on shafts 198, the rear one of which is provided with an arm 199, which communicates the motion of the said shaft to a valve 200 by means of a connecting-rod 201. The internal arrangement of the valve 200 is similar to the valve 182, hereinbefore described, and it communicates, by means of pipes 202 and 203, with the tubes 178 and 179, respectively. The pipe 204, which is connected with the end of the valve 200, communicates, by means of the flexible tube 135, hereinbefore described, with the cylinder 132, which operates the hammer 133 for striking the top of the type-bars 103. At the opposite end of the rear shaft 198 is a second arm 205, which is carried by a sleeve 206, loosely mounted on the shaft 198. This arm 205 is connected, by means of a rod 207, with a valve 208, similar to the valve 200. The valve 208 is connected, by means of pipes 209 and 210, Fig. 19, with the tubes 178 and 179. The pipe 211, leading from the end of the valve 208, communicates, by means of a flexible tube, with the cylinder 144, which actuates the feeding mechanism. The arm 205 is provided on its lower end with a pin 212, which coöperates with the notched ends of bars 213 and 214. (See also Figs. 25 and 26.) The bar 213 is pivoted to an arm 215, which is carried on one of the shafts 198. The opposite end of the lever is supported by means of a link 216. The bar 214 is carried by an arm 217, which is carried on a shaft 218. The shaft 218 is provided with a pair of arms 219, to which are pivoted the rods 220, projecting downwardly from the space-board 221. The arm 205 is held in its normal position by means of a spring 222, connected at one end to said arm and at the other to a support 223, Fig. 23, carried on one of the bars 224, which are secured to the side frames 175. 225 represents the shift-keys, (shown in detail in Fig. 2,) which are in all respects like the keys 181, except that the collars 192 on the rods 190 are not provided with the upward extensions 193 and fingers 194, so that when the keys are depressed they do not operate the rods 198, and hence do not operate either the type-hammer or the spacing mechanism. These keys may be situated at any part of the keyboard, but are preferably arranged at the left-hand end, as shown in Fig. 19. The flexible tubes leading from these keys are connected with the tubes 128, which operate the shift mechanism. The bar 214 is supported by a link 226, similar to the link 216. The bell-crank levers 196 are held in their normal position by a spring 227, Fig. 20, fastened at one end to one of said bell-crank levers and at the other to a strip 228, secured to the frame 175.

The various flexible tubes 136, &c., leading from the valves of the keyboard mechanism, are carried under the table-top 30, as shown in Fig. 1, and thence up behind the table and over a spool 230, from which they lead to the type-carriage 98 and are secured to the various pistons of the type-carriage, as has been hereinbefore described. The spool 230 is mounted upon a rod 231, which extends across the rear end of the table, as shown in Fig. 6. The spool 230 is loosely mounted on the rod 231, so as to rotate on the same and also to have longitudinal movement on the rod to allow of the lateral movement of the type-carriage. The rod 231 is supported at a suitable distance above the table-top 30 by means of standards 232.

Figure 9:
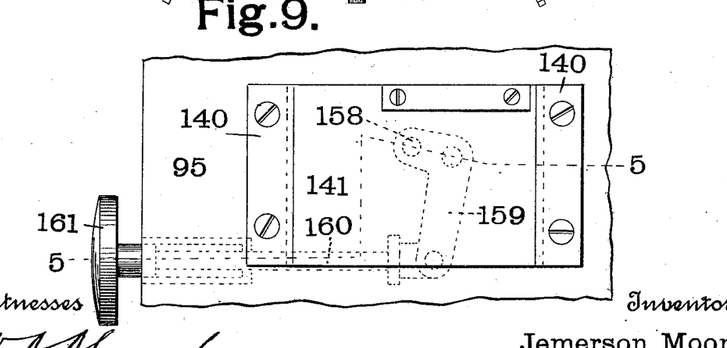
Fig. 9 is an enlarged detail view showing the feed-releasing mechanism.
Figure 10:
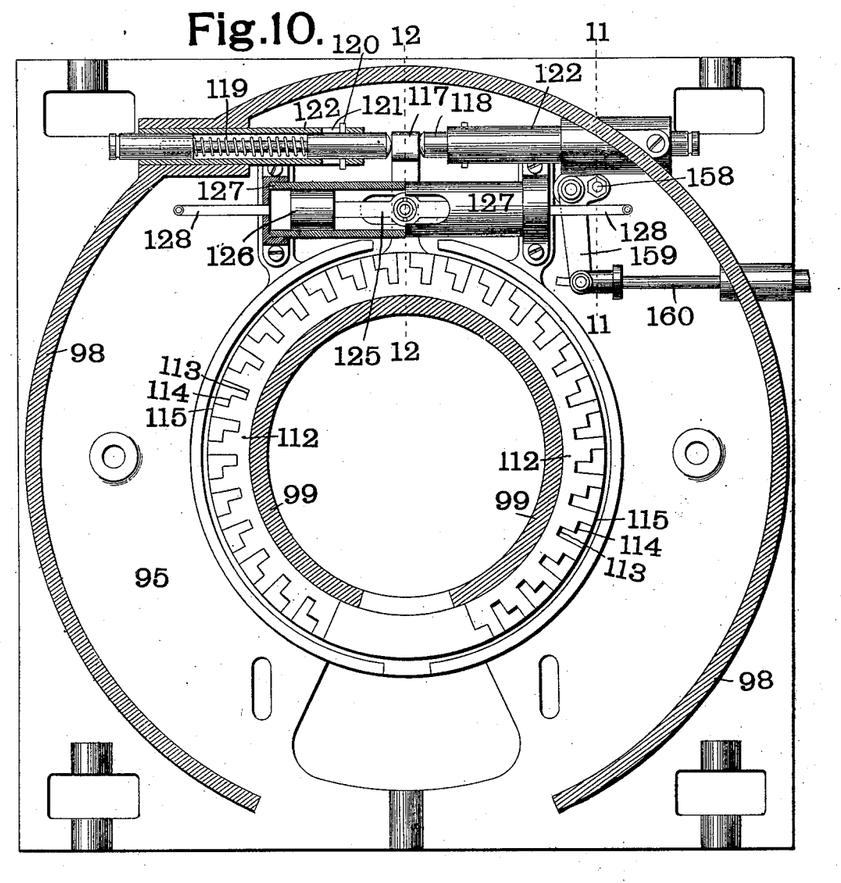
Fig. 10 is a horizontal section through the type-carriage.
Figure 11:
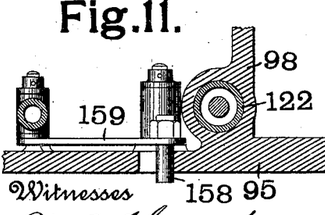
Figs. 11 and 12 are slightly-enlarged sections on the lines 11 11 and 12 12, respectively, of Fig. 10.
Figure 12:
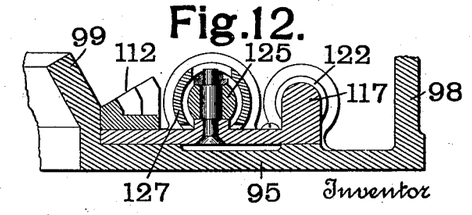

The operation of my machine is as follows: The book upon which the writing is to be done is placed upon the table-top 30, the covers of the book resting upon the movable portions 55, Fig. 6. In order to do this, the frames 65 and 75 are raised upon their hinges 66 and 77. Two leaves of the book are drawn up through the opening between the platens 70, one leaf being allowed to lie upon each platen. The book can then be adjusted to the proper height by moving the handles 63, and thus raising or lowering the movable parts 55 of the table-top. When the book is in the proper position, the lower end of the leaves are clamped against the platens by means of a clamp 71 and the frames are lowered into position on the table-top. When the machine is not in use, the annular member 108, Figs. 8 and 17, should be turned in such a position that the shoulders 107 of the guide-bars 105 will be out of register with the slots 109, and hence the pistons 101 cannot drop toward the center of the type-carriage, which might cause injury to the frames 102 and type-bars 103. When the book is in position for writing, the treadle 37 is operated to actuate the air-pump 48, so that the air in the tube 179, Fig. 20, is compressed and that within the tube 178 is rarefied. As soon as this has been accomplished the annular member 108 can be turned by means of the finger-piece 110 so that the pistons 101 are free to move toward the center of the type-carriage. All the pistons, however, being in communication with the vacuum-tube 178 through the valves 182, the pistons will be retained in their normal positions. When one of the keys 180 is depressed, the corresponding tube 136, communicating with the corresponding cylinder 100, will be cut off from the vacuum-tube 178 by the downward movement of the valve-stem 101 and will be placed in communication with the pressure-tube 179 when the port 187 comes in communication with the pipe 184. The compressed air will then pass down through the passage 185 to the tube 189 and thence through the flexible tube 136 to the piston 100. The piston 100 will be driven toward the center of the carriage until the shoulder 107 strikes against the shoulder 114, Fig. 10, of the annular member 112. This will bring the central type-bar 103 in position to be struck by the hammer 133. At the same time the finger 194, Figs. 20 and 22, on the stem 190 of the key 180 will force down the rod 195, connecting two of the bell-crank levers 196. This will cause the shafts 198 to rock, and so through the arm 199 and rod 201 actuate the valve 200 and at the same time by means of the arm 215 and bar 213 (see also Fig. 25) actuate the arm 205, which through the medium of the rod 207 will actuate the valve 208. The movement of the valve 200 will cause the pipe 204 to be cut off from the vacuum-tube 178 and placed in communication with the pressure-tube 179. This through the flexible pipe connection will supply pressure to the cylinder 144, Fig. 13, and thus move the T-lever 142 so as to feed the type-carriage one space toward the right. At the same time it will actuate the ribbon-feeding mechanism through the connections shown in Fig. 13. The movement of the valve 208 will cause the pipe 211 to be cut off from the vacuum and placed in communication with the pressure tube. The pipe 211, as hereinbefore described, is connected by means of flexible tubes 135 with the cylinder 132, and hence the hammer 133 will be actuated to drive the type-bar 103, which is now beneath the hammer, down against the ribbon, thus causing the character to be printed on the book. In case the space-bar 121 is struck, the rock-shaft 218 will be actuated, which through the arm 217 and bar 214 will actuate the arm 205. This through the arm 207 will actuate the valve 208. As the arm 205 is carried on the sleeve 206, which is loosely mounted on the shaft 198, the valve 200 will not be actuated, and hence only the feeding mechanism will be operated to feed the type-carriage one space to the right. When one of the shift-keys 225 is operated, the rock-shafts 198 will not be actuated, because said shift-keys 225 are not provided with the fingers 194. The only result of operating the shift-keys 225 will be to place one of the flexible tubes 128 in communication with the pressure in place of the exhaust. This will cause the pistons 126 in the cylinder 127, Fig. 10, to be driven to one end of the said cylinder. This through the arm 117 will rotate the annular member 112 in one direction or the other, so as to bring either the shoulders 115 or shoulders 113 in position to engage the shoulders 107 of the guides, according to which shift-key has been operated. As soon as the end of the line is reached the button 161, Figs. 5, 9, and 10, is pressed inwardly. This through the rod 160 actuates the bell-crank lever 128, which through the pin 158 slides the block 141 in the guides 140 so as to disengage both the pawls 143, Fig. 13, and the rack 81. The carriage can then be freely returned to the left of the machine. The carriage is moved to the left until the pin 137 strikes against the adjustable abutment 89, Fig. 6. This moves the rod 82 toward the left and through the pawls 83 rotates the ratchet-wheels 84. The movement of the ratchet-wheels 84 through the spur-wheels 85 and 87, Fig. 24, feeds the frame carrying the type-carriage in the direction of the length of the paper—that is, performs the line-spacing.

I am aware that many changes may be made in the form and construction of my machine without departing from the spirit of my invention, and therefore do not desire to limit myself to the construction shown and described except where specifically pointed out in the claims.

Having fully described my invention, what I claim as new, and desire to secure by Letters Patent of the United States, is—

1. In a type-writing machine, the combination with a movable type-carriage, of a normally stationary keyboard, pneumatic operating connections between said keyboard and type-carriage, and means independent of said keyboard for supplying the power to operate the type.

2. In a type-writing machine, the combination with a type-carriage movable laterally and longitudinally of the page, of a normally stationary keyboard, pneumatic connections between said keyboard and type-carriage, and means independent of said keyboard for supplying the power to operate the type.

3. In a type-writing machine, the combination with a supporting-table, of a vertically-movable member carried by said table for supporting a book, a type-carriage movable laterally and longitudinally of said book, a normally stationary keyboard, and connections between said keyboard and type-carriage.

4. In a type-writing machine, the combination with a supporting-table, of a pair of vertically-movable members carried by said table for supporting a book, a type-carriage movable laterally and longitudinally of said book, a normally stationary keyboard, and operating connections between said keyboard and type-carriage.

5. In a type-writing machine, the combination with a table for supporting a book, of a frame pivotally mounted on said table and adapted to support the leaves of said book, a type-carriage movable laterally on said frame, a stationary keyboard, and operating connections between said keyboard and type-carriage.

6. In a type-writing machine, the combination with a table for supporting a book, of a frame pivotally mounted on said table for supporting the leaves of said book, a second frame also pivotally mounted on said table, a type-carriage carried by said second frame and adapted to move laterally thereon, a stationary keyboard, and operating connections between said keyboard and type-carriage.

7. In a type-writing machine, the combination with a table for supporting a book, of a frame pivotally mounted on said table for supporting the leaves of said book, a second frame pivotally mounted on said table, a third frame movable longitudinally of said second frame, a type-carriage carried by said third frame, a stationary keyboard, and operating connections between said keyboard and type-carriage.

8. In a type-writing machine, the combination with a table for supporting a book, of a frame pivotally mounted on said table for supporting the leaves of said book, a second frame also pivotally mounted on said table, a third frame movable longitudinally of said second frame, a type-carriage carried by said third frame and movable laterally, a stationary keyboard, and operating connections between said keyboard and type-carriage.

9. In a type-writing machine, the combination with a table for supporting a book, of a type-carriage movable laterally and longitudinally on said table, a stationary keyboard, operating connections between said keyboard and type-carriage, means operated through said keyboard for feeding said type-carriage laterally, and automatic means actuated by the return of said carriage for feeding said carriage longitudinally.

10. In a type-writing machine, the combination with a pressure-chamber, of a vacuum-chamber, type-operating mechanism normally in communication with said vacuum-chamber, and a plurality of keys adapted to place said type-operating mechanism in communication with said pressure-chamber.

11. In a type-writing machine, the combination with a vacuum-chamber, of a pressure-chamber, a plurality of type-bars, operating mechanism for said type-bars normally in communication with said vacuum-chamber, a plurality of keys for placing said operating mechanism in communication with said pressure-chamber, a hammer for said type-bars, and means for placing said hammer in communication with said pressure-chamber.

12. In a type-writing machine, the combination with a plurality of keys, of a pressure-chamber, of a vacuum-chamber, valves actuated by said keys and communicating with said chambers, a plurality of type-actuating cylinders, connections between said valves and type-actuating cylinders, a type carried by said cylinders, a pneumatic hammer for striking said type, and connections operated by the depression of said keys for actuating said hammer.

13. In a type-writing machine, the combination with a plurality of radially-movable type, of a member for variably limiting the radial movement of said type, a keyboard, and pneumatic connections between said keyboard and member for variably limiting the radial movement of said type.

14. In a type-writing machine, the combination with a plurality of radially-movable type, of an annular member provided with a plurality of sets of shoulders for variably limiting the radial movement of said type, and means for rotating said annular member to vary the radial movement of said type.

15. In a type-writing machine, the combination with a plurality of radially-movable type, of an annular member provided with a plurality of sets of shoulders for varying the radial movement of said type, a keyboard, and operating connections between said keyboard and annular member for rotating the latter.

16. In a type-writing machine, the combination with a plurality of radially-movable type, of an annular member provided with a plurality of sets of shoulders for limiting the radial movement of said type, a keyboard, and pneumatic connections between said keyboard and annular member for rotating the latter.

17. In a type-writing machine, the combination with a plurality of radially-movable members, of a plurality of type-bars carried by each of said members, means for variably limiting the movement of said radially-movable members, and means for actuating said type-bars.

18. In a type-writing machine, the combination with a laterally-movable type-carriage carrying a plurality of type, of a valve for controlling the feed of said type-carriage, a plurality of valves for controlling the movement of said type, means for simultaneously actuating one of said latter-named valves and said first-named valves to actuate said type and feed said carriage, and means for independently actuating said first-named valve to feed said carriage.

19. In a type-writing machine, the combination with a laterally-movable type-carriage carrying a plurality of type, a hammer for actuating said type, a valve for controlling the feed of said carriage, a valve for controlling the movement of said hammer, means for simultaneously actuating both said valves, and independent means for actuating said latter-named valve to feed said carriage.

In testimony whereof I have hereunto set my hand and affixed my seal in presence of the two subscribing witnesses.

JEMERSON MOORE. [L. S.]

Witnesses:
 FRANK PACE,
 WILLIAM F. PACE.